(12) United States Patent
Wang et al.

(10) Patent No.: US 11,654,636 B2
(45) Date of Patent: May 23, 2023

(54) ULTRASONIC WELD-BONDING OF THERMOPLASTIC COMPOSITES

(71) Applicant: GM GLOBAL TECHNOLOGY OPERATIONS LLC, Detroit, MI (US)

(72) Inventors: Pei-chung Wang, Troy, MI (US); Bradley J. Blaski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 16/896,512

(22) Filed: Jun. 9, 2020

(65) Prior Publication Data
US 2020/0338835 A1    Oct. 29, 2020

Related U.S. Application Data

(62) Division of application No. 15/605,224, filed on May 25, 2017, now abandoned.
(Continued)

(51) Int. Cl.
*B29C 65/08*      (2006.01)
*B29C 65/00*      (2006.01)
(Continued)

(52) U.S. Cl.
CPC ............ *B29C 65/08* (2013.01); *B29C 65/483* (2013.01); *B29C 65/72* (2013.01);
(Continued)

(58) Field of Classification Search
CPC ....... B29C 65/08; B29C 65/483; B29C 65/72; B29C 65/7855; B29C 65/7829;
(Continued)

(56) References Cited

U.S. PATENT DOCUMENTS 7,993,537 B2    8/2011    Hector, Jr. et al.
8,747,015 B1    6/2014    Polewarczyk et al.
(Continued)

FOREIGN PATENT DOCUMENTS

CN      201685455 U    12/2010
CN      105392590 A    3/2016
(Continued)

OTHER PUBLICATIONS

First Office Action for Chinese Patent Application No. 201710447248.6 dated Mar. 5, 2019 with English language machine translation, 13 pages.
(Continued)

*Primary Examiner* — George R Koch
(74) *Attorney, Agent, or Firm* — Harness, Dickey & Pierce, P.L.C.

(57) ABSTRACT

Methods for ultrasonic welding of thermoplastic polymer workpieces and assemblies made therefrom are provided. The method may comprise disposing a first region of a first thermoplastic polymer workpiece and a second region of a second thermoplastic polymer workpiece between an ultrasonic horn and an anvil of an ultrasonic welding device. The first workpiece has a preformed deformation and at least one of the first and/or second workpieces has an adhesive precursor applied thereto. The ultrasonic horn or anvil seats within the preformed deformation. Ultrasonic energy is applied from the ultrasonic horn to create a weld nugget between the first and second workpieces. The assembly thus formed has a green strength sufficient to be further processed immediately. The methods provide a robust weld joint with controlled adhesive bondline thickness.

20 Claims, 4 Drawing Sheets

Related U.S. Application Data (60) Provisional application No. 62/349,845, filed on Jun. 14, 2016.

(51) Int. Cl.
| | | |
|---|---|---|
| *B29C 65/78* | (2006.01) | |
| *B29C 65/48* | (2006.01) | |
| *B29C 65/72* | (2006.01) | |
| *B29L 31/30* | (2006.01) | |
| *B29L 31/00* | (2006.01) | |
| *B29K 77/00* | (2006.01) | |
| *B29K 507/04* | (2006.01) | |
| *B29K 301/12* | (2006.01) | |

(52) U.S. Cl.
CPC ...... *B29C 65/7855* (2013.01); *B29C 66/1122* (2013.01); *B29C 66/302* (2013.01); *B29C 66/30221* (2013.01); *B29C 66/472* (2013.01); *B29C 66/73921* (2013.01); *B29C 66/81422* (2013.01); *B29C 66/8322* (2013.01); *B29C 65/7829* (2013.01); *B29C 66/71* (2013.01); *B29C 66/7212* (2013.01); *B29K 2077/00* (2013.01); *B29K 2301/12* (2013.01); *B29K 2507/04* (2013.01); *B29L 2031/30* (2013.01); *B29L 2031/7172* (2013.01)

(58) Field of Classification Search
CPC ............... B29C 66/1122; B29C 66/302; B29C 66/30221; B29C 66/472; B29C 66/81422; B29C 66/8322; B29C 66/71; B29C 66/7212
See application file for complete search history.

(56) References Cited

U.S. PATENT DOCUMENTS

| | | | |
|---|---|---|---|
| 8,747,606 B2 | 6/2014 | Xie et al. | |
| 9,527,236 B2 | 12/2016 | Wang | |
| 9,550,323 B2 | 1/2017 | Wang et al. | |
| 9,573,320 B2 | 2/2017 | Wang | |
| 9,643,356 B2 | 5/2017 | Matsuo et al. | |
| 10,160,161 B2 | 12/2018 | Wang | |
| 2004/0197534 A1* | 10/2004 | Miller | B32B 27/32 428/196 |
| 2006/0169387 A1* | 8/2006 | Nayar | B29C 66/81433 442/381 |
| 2009/0065484 A1 | 3/2009 | Wang et al. | |
| 2013/0122246 A1* | 5/2013 | Berger | B32B 15/08 156/92 |
| 2014/0079908 A1* | 3/2014 | Kato | B29C 66/7212 428/140 |
| 2014/0219710 A1* | 8/2014 | Ezzat | B29C 66/91933 156/308.4 |
| 2015/0041047 A1 | 2/2015 | Wand | |
| 2015/0041070 A1* | 2/2015 | Wang | B29C 66/3024 156/580 |
| 2015/0053328 A1 | 2/2015 | Wang et al. | |
| 2015/0068662 A1 | 3/2015 | Wang | |
| 2015/0068663 A1 | 3/2015 | Wang | |
| 2015/0129110 A1 | 5/2015 | Klinstein et al. | |
| 2016/0354858 A1 | 12/2016 | Wang et al. | |

FOREIGN PATENT DOCUMENTS

| | | |
|---|---|---|
| CN | 107498879 A | 12/2017 |
| DE | 102012220333 A1 | 5/2013 |
| DE | 102017112744 A1 | 12/2017 |

OTHER PUBLICATIONS

Second Office Action for Chinese Patent Application No. 201710447248.6 dated Nov. 18, 2019 with English language machine translation, 10 pages.
First Office Action for German Patent Application No. 102017112744.5 dated Jul. 18, 2019 with correspondence from Manitz Finsterwald Patentanwalte PartmbB dated Aug. 6, 2019 summarizing contents, 6 pages.
Second Office Action for German Patent Application No. 102017112744.5 dated Jul. 28, 2021 with correspondence from Manitz Finsterwald Patentanwalte PartmbB dated Aug. 19, 2021 summarizing contents, 6 pages.
Ashby, Mike et al., "Materials and Design: The Art and Science of Material Selection in Product Design," Elsevier, 2009, pp. 274-297.
U.S. Appl. No. 15/605,224, filed May 25, 2017.
English language machine translation provided by Espacenet for First Office Action for corresponding Chinese Patent Application No. 201710447248.6 dated Mar. 5, 2019, citing "X" reference CN-201685455-U and "A" reference CN-105392590-A.
English language machine translation provided by Espacenet for Second Office Action for corresponding Chinese Patent Application No. 201710447248.6 dated Nov. 18, 2019, citing US 2013/0122246 A1.
First Office Action for corresponding German Patent Application No. 102017112744.5 dated Jul. 18, 2019 citing DE102012220333 A1 and correspondence dated Aug. 6, 2019, from Manitz Finsterwald Patentanwälte PartmbB summarizing contents.
Second Office Action for corresponding German Patent Application No. 102017112744.5 dated Jul. 28, 2021 citing DE 102012220333 A1 and correspondence dated Aug. 19, 2021, from Manitz Finsterwald Patentanwälte PartmbB summarizing contents.
English language machine translation provided by Espacenet for CN-201685455-U.
English language machine translation provided by Espacenet for CN-105392590-A. Further, U.S. Pat. No. 9,643,356 is believed to be an English language equivalent of CN-105392590-A.
English language machine translation provided by Espacenet for CN-107498879-A. As noted below, this is a publication of counterpart Chinese Patent Application No. 201710447248.6 to the present application.
English language machine translation provided by Espacenet for DE 102012220333 A1. Further, U.S. Publication No. 2013/0122246 is believed to be an English language equivalent of DE 102012220333 A1.
English language machine translation provided by Espacenet for DE-102017112744-A1. As noted below, this is a publication of counterpart German Patent Application No. 1020171127445 to the present application.

* cited by examiner

ULTRASONIC WELD-BONDING OF THERMOPLASTIC COMPOSITES

CROSS-REFERENCE TO RELATED APPLICATIONS

This application is a divisional of U.S. Nonprovisional application Ser. No. 15/605,224 filed on May 25, 2017, now abandoned, which claims the benefit of U.S. Provisional Application No. 62/349,845 filed on Jun. 14, 2016. The entire disclosures of the above applications are incorporated herein by reference.

FIELD

The present disclosure relates to new methods and systems for improved ultrasonic weld-bonding of thermoplastic polymeric materials.

INTRODUCTION

In a vibration welding process, such as ultrasonic welding, adjacent surfaces of a workpiece or multiple workpieces are joined together by applying vibrational energy. For example, two or more workpieces may be joined together, while calibrated vibrational energy is transmitted from an ultrasonic welder through at least one of the workpieces. The vibration creates surface friction along interfacing surfaces and internal friction of the workpieces. Where the workpieces are formed of a polymeric or plastic material, the resultant heat softens the interfacing surfaces, and thus fuses or bonds the workpieces by forming a weld nugget between the workpieces.

In current ultrasonic welding techniques for polymeric materials, an adhesive may be applied between the workpieces that requires curing or cross-linking after the formation of ultrasonic energy. Pressure is applied during the ultrasonic welding process (between the ultrasonic horn and anvil) that forces the adhesive to migrate outside of the welded region where the weld nugget is formed. The process of forming the weld nugget via ultrasonic welding therefore causes undesirable variation in bond line thicknesses and joint strengths. Further, the post-welding curing must be done to provide sufficient strength between the workpieces before further processing of the workpieces can proceed in an assembly line, for example, heating the workpieces for at least 10 minutes (e.g., at 100° C.) or longer. Typically, such curing is done in a furnace or by other techniques that apply heat to the polymeric workpieces. Thus, not only does the post-welding curing process take considerable cycle time, but the heating process can ultimately weaken the workpieces. It would be desirable to have a new method of ultrasonic welding of polymeric materials that minimizes cycle time during assembly, but also improves control over the bond line formed between workpieces.

SUMMARY

This section provides a general summary of the disclosure, and is not a comprehensive disclosure of its full scope or all of its features.

In various aspects, the present disclosure provides a method for ultrasonic welding of polymeric workpieces. In one aspect, the method may include disposing a first region of a first thermoplastic polymer workpiece and a second region of a second thermoplastic polymer workpiece between an ultrasonic horn and an anvil of an ultrasonic welding device. The first thermoplastic polymer workpiece has a preformed deformation in the first region. Further, at least one of the first thermoplastic polymer workpiece and the second thermoplastic polymer workpiece has an adhesive precursor applied thereto. At least one of the ultrasonic horn or the anvil seats within the preformed deformation to provide a predetermined bondline between the first thermoplastic polymer workpiece and the second thermoplastic polymer workpiece. The method further includes applying ultrasonic energy from the ultrasonic horn to create a weld nugget between the first thermoplastic polymer workpiece and the second thermoplastic polymer workpiece. An assembly of the first thermoplastic polymer workpiece and the second thermoplastic polymer workpiece having the weld nugget is thus formed that has a green strength so that the assembly can be further processed immediately.

In one aspect, the method further includes oscillating the first thermoplastic polymer workpiece and the second thermoplastic polymer workpiece at a frequency of greater than or equal to about 15 KHz to less than or equal to about 40 KHz.

In one aspect, the deformation has a depth of greater than or equal to about 0.5 mm and less than or equal to about 3 mm and a diameter or width of greater than or equal to about 7 mm and less than or equal to about 20 mm.

In one aspect, the deformation has a cross-sectional shape that corresponds to a cross-sectional shape of the ultrasonic horn and the method further includes seating the ultrasonic horn in the deformation during the disposing.

In one aspect, the deformation has a round or oval cross-sectional shape.

In one aspect, the weld nugget has a diameter of greater than or equal to about 3 mm and less than or equal to about 18 mm.

In one aspect, the first thermoplastic polymer workpiece and the second thermoplastic polymer workpiece each independently has a thickness of greater than or equal to about 0.5 mm to less than or equal to about 5 mm.

In one aspect, the predetermined bondline where the adhesive is formed between the first thermoplastic polymer workpiece and the second thermoplastic polymer workpiece has an average thickness of greater than or equal to about 0.25 mm to less than or equal to about 1.25 mm.

In one aspect, the first thermoplastic polymer workpiece and the second thermoplastic polymer workpiece are a composite material including: a thermoplastic polymer formed from a material independently selected from the group consisting of: polyamide resin, polystyrene resin, acrylonitrile styrene resin, acrylonitrile-butadiene-styrene resin, polyvinyl alcohol resin, vinyl chloride resin, vinylidene chloride resin, vinyl acetate resin, acrylic resin, polyacrylate resin, methacrylate resin, polypropylene resin, polyethylene resin, polycarbonate resin, polyacetal resin, polylactide resin, polyethylene terephthalate resin, polyethylene naphthalate resin, polybutylene terephthalate resin, polyphenylene ether resin, polyphenylene sulfide resin, polysulfone resin, polyether sulfone resin, polyether ether ketone resin, copolymers, and combinations thereof; and a reinforcement material selected from the group consisting of: carbon fibers, glass fibers, carbon black particles, and combinations thereof.

In one aspect, the adhesive precursor forms an adhesive selected from the group: acrylates, methacrylates, epoxies, and copolymers and combinations thereof.

In one aspect, the method further includes transferring the assembly to at least one downstream processing station and after processing in the downstream processing station, the adhesive precursor is permitted to react and form the adhesive at ambient conditions.

In one aspect, the first thermoplastic polymer workpiece further includes a plurality of energy director features in the preformed deformation that are capable of focusing the ultrasonic energy as it is applied to initiate heating in the first region.

In one further aspect, a region around the weld nugget is substantially free of any ghost welds.

In other aspects, the present disclosure provides an assembly that includes a first thermoplastic polymer workpiece having has a preformed deformation in a first region and a second thermoplastic polymer workpiece. The assembly further includes an adhesive disposed between the first thermoplastic polymer workpiece and the second thermoplastic polymer workpiece that defines a predetermined bondline having an average thickness of greater than or equal to about 0.25 mm to less than or equal to about 1.25 mm. The assembly also includes a weld nugget formed between the second thermoplastic polymer workpiece and the first thermoplastic polymer workpiece in a region corresponding to the preformed deformation.

In one aspect, the deformation has a depth of greater than or equal to about 0.5 mm and less than or equal to about 3 mm and a diameter or width of greater than or equal to about 7 mm and less than or equal to about 20 mm.

In one aspect, the deformation has a round or oval cross-sectional shape.

In one aspect, the weld nugget has a diameter of greater than or equal to about 3 mm and less than or equal to about 18 mm.

In one aspect, the first thermoplastic polymer workpiece and the second thermoplastic polymer workpiece each independently has a thickness of greater than or equal to about 0.5 mm to less than or equal to about 5 mm.

In one aspect, the first thermoplastic polymer workpiece and the second thermoplastic polymer workpiece are a composite material including: a thermoplastic polymer formed from a material independently selected from the group consisting of: polyamide resin, polystyrene resin, acrylonitrile styrene resin, acrylonitrile-butadiene-styrene resin, polyvinyl alcohol resin, vinyl chloride resin, vinylidene chloride resin, vinyl acetate resin, acrylic resin, polyacrylate resin, methacrylate resin, polypropylene resin, polyethylene resin, polycarbonate resin, polyacetal resin, polylactide resin, polyethylene terephthalate resin, polyethylene naphthalate resin, polybutylene terephthalate resin, polyphenylene ether resin, polyphenylene sulfide resin, polysulfone resin, polyether sulfone resin, polyether ether ketone resin, copolymers, and combinations thereof; and a reinforcement material selected from the group consisting of: carbon fibers, glass fibers, carbon black particles, and combinations thereof.

In one aspect, the adhesive is selected from the group: acrylates, methacrylates, epoxies, copolymers, and combinations thereof.

In one aspect, the preformed deformation in the first region further includes a plurality of energy director features.

In one further aspect, a region around the weld nugget is substantially free of any ghost welds.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
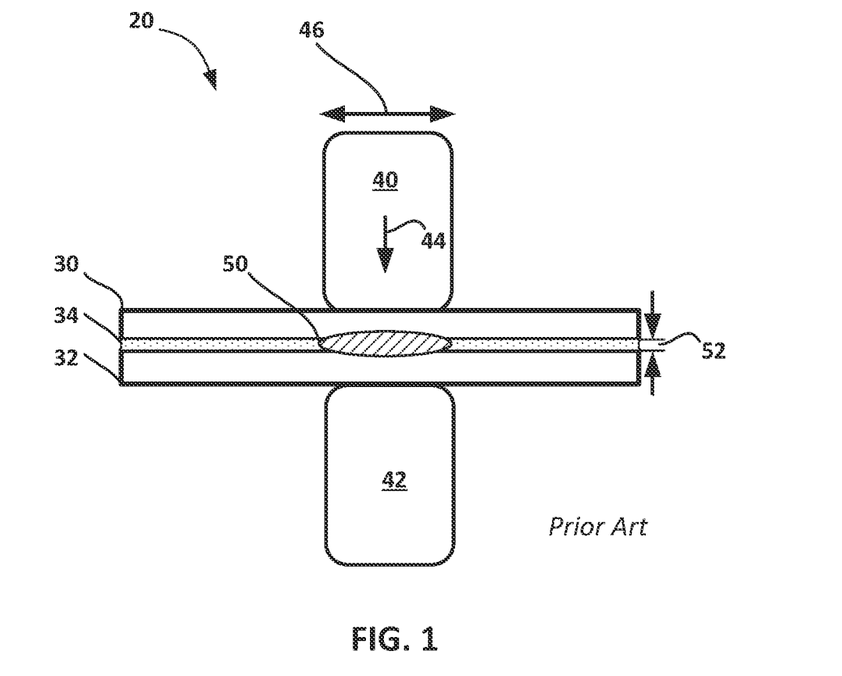
FIG. 1 shows a schematic of a system for ultrasonic bonding of polymeric materials.

As noted above, in a vibration welding process like ultrasonic welding, adjacent surfaces of a workpiece or multiple workpieces are joined together by applying ultrasonic energy or vibrational energy to the workpiece. An exemplary and simplified conventional ultrasonic welding device 20 is shown in FIG. 1. A first polymeric workpiece 30 comprises a polymer, such as a thermoplastic polymer, and has a planar or flat shape in a region to be welded. A second polymeric workpiece 32 likewise comprises a polymer, like a thermoplastic polymer, and also has a planar or flat shape in the region where it will be welded. An adhesive precursor 34 is applied between the first polymeric workpiece 30 and the second polymeric workpiece 32.

As shown, the first polymeric workpiece 30 and the second polymeric workpiece 32 are clamped together between an ultrasonic horn 40 and an anvil 42 on an opposite side. Thus, the ultrasonic horn 40 contacts the first polymeric workpiece 30, while the anvil 42 contacts the second polymeric workpiece 32. The ultrasonic horn 40 is also known as a sonotrode and together with an affiliated ultrasonic transducer vibrates when energized and generates ultrasonic energy that is transmitted through the first polymeric workpiece 30 to the second polymeric workpiece 32. The anvil 42 may be formed of a relatively large piece of metal having sufficient rigidity for opposing the ultrasonic horn 40. Together the ultrasonic horn 40 and anvil 42 define a welder body of a welding apparatus. While not shown, the ultrasonic horn 40 and/or the anvil 42 may include welding pads and other welding system components.

A downward arrow 44 indicates a direction that pressure is applied to the first polymeric workpiece 30 and the second polymeric workpiece 32 when the ultrasonic horn 40 is brought into contact with the first polymeric workpiece 30. The vibrational energy, as represented by double arrow 46, from the ultrasonic horn 40 creates surface friction along interfacing surfaces of the first polymeric workpiece 30 and the second polymeric workpiece 32 and internal friction of the workpieces 30 and 32. The resultant heat softens the interfacing surfaces, thus bonding the first polymeric workpiece 30 and the second polymeric workpiece 32 to form a weld nugget 50. A bondline 52 is defined where the adhesive is present (after the adhesive precursor 34 is cured) between the first polymeric workpiece 30 and the second polymeric workpiece 32.

In a conventional ultrasonic welding process like that shown in FIG. 1, the pressure that is applied between the ultrasonic horn 40 and anvil 42 during welding (either by clamping and/or through application of ultrasonic energy) causes the adhesive precursor 34 between the first polymeric workpiece 30 and the second polymeric workpiece 32 to be forced away from the site or region where the weld nugget 50 is formed. Thus, the adhesive precursor 34 is pushed away from the region of the weld nugget 50 and thinned out or removed as it extends outwards. In this manner, the adhesive precursor 34 spreads outward in an undesirable and uncontrolled manner and results in an unpredictable or uneven bondline in the cured adhesive in the region in and around the weld nugget 50. The uneven bondline can cause variable strength in the bond.

In conventional processes, after the ultrasonic welding is conducted, the assembly is further treated to cure/react the adhesive precursor to provide sufficient green strength of the adhesive bond for additional processing. Thus, after welding, in a conventional process the assembly is transferred to a furnace for a set amount of time (e.g., a furnace at 100° C. for 10 minutes) or is allowed to cure or react for longer periods at ambient conditions (e.g., for 24 hours). This curing/reaction time slows processing and cycle time considerably. Furthermore, the heat from the welding process can also degrade the adhesive precursor 34, especially where it is thinnest, and thus can diminish the strength of the weld-bonded polymeric composite assembly that is formed.

Figure 2:
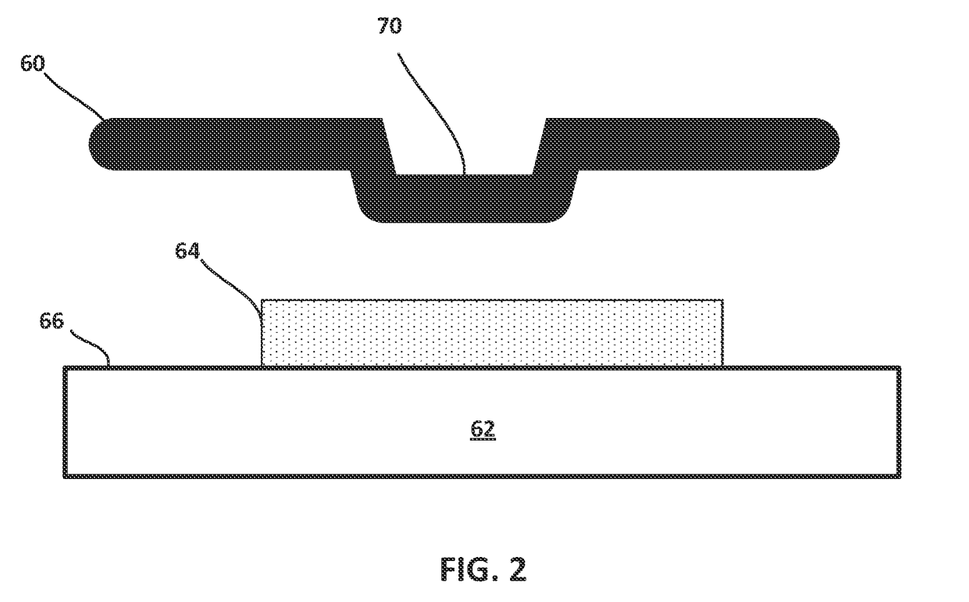
FIG. 2 shows a schematic of two polymeric workpieces to be joined having an applied adhesive precursor, where one workpiece has a protruding preformed deformation in accordance with various aspects of the present disclosure.

The present disclosure contemplates a new method of ultrasonic welding polymeric workpieces together. It should be noted that while two workpieces are discussed, the concepts in the present disclosure are equally applicable to a single workpiece that is being joined at different regions or to multiple workpieces (e.g., three of more) being j oined together. At least one of the first thermoplastic polymer workpiece and the second thermoplastic polymer workpiece has an adhesive precursor applied thereto. With reference to FIG. 2, a first workpiece 60 comprising a first thermoplastic polymer and a second workpiece 62 comprising a second thermoplastic polymer are to be joined. The first and second thermoplastic polymers may be the same or distinct from one another. Thermoplastic polymers are capable of softening under frictional heat (e.g., surface friction) between the workpieces and vibration from ultrasonic energy to form a fused bond. The thermoplastic polymer may be formed from any suitable kind of thermoplastic resin. By way of non-limiting example, the thermoplastic polymer may include: nylons or polyamide resins (nylon 6, nylon 11, nylon 12, nylon 46, nylon 66, nylon 610), polystyrene resin, acrylonitrile styrene resin, acrylonitrile-butadiene-styrene resin, polyvinyl alcohol resin, vinyl chloride resin, vinylidene chloride resin, vinyl acetate resin, acrylic resin, polyacrylate resin, methacrylate resin, polypropylene resin, polyethylene resin, polycarbonate resin, polyacetal resin, polylactide resin, polyethylene terephthalate resin, polyethylene naphthalate resin, polybutylene terephthalate resin, polyphenylene ether resin, polyphenylene sulfide resin, polysulfone resin, polyether sulfone resin, polyether ether ketone resin, copolymers, and combinations thereof.

In certain aspects, the first workpiece 60 comprising a first thermoplastic polymer and/or the second workpiece 62 comprising a second thermoplastic polymer may be a polymeric composite material that comprises a thermoplastic polymer matrix and a reinforcement material, such as a plurality of reinforcing particles or fibers distributed therein. In certain aspects, a polymeric composite may include a plurality of carbon fibers, glass fibers, or carbon black, as the reinforcement material, by way of non-limiting example. The plurality of reinforcing particles or fibers may be included at greater than or equal to about 5 weight % to less than or equal to about 90 weight % of the total composite, and in certain variations, optionally at greater than or equal to about 15 weight % to less than or equal to about 60 weight %. In one example, a suitable polymeric composite structure for a workpiece may be a thermoplastic carbon fiber reinforced composite.

In certain aspects, the first thermoplastic polymer workpiece and the second thermoplastic polymer workpiece are a composite material each independently comprising a thermoplastic polymer formed from a material selected from the group consisting of: polyamide resin, polystyrene resin, acrylonitrile styrene resin, acrylonitrile-butadiene-styrene resin, polyvinyl alcohol resin, vinyl chloride resin, vinylidene chloride resin, vinyl acetate resin, acrylic resin, polyacrylate resin, methacrylate resin, polypropylene resin, polyethylene resin, polycarbonate resin, polyacetal resin, polylactide resin, polyethylene terephthalate resin, polyethylene naphthalate resin, polybutylene terephthalate resin, polyphenylene ether resin, polyphenylene sulfide resin, polysulfone resin, polyether sulfone resin, polyether ether ketone resin, copolymers, and combinations thereof and a reinforcement material selected from the group consisting of: carbon fibers, glass fibers, carbon black particles, and combinations thereof.

In certain aspects, the first thermoplastic polymer workpiece and the second thermoplastic polymer workpiece are composite materials that independently comprise a polyamide thermoplastic polymer and a reinforcement material selected from the group consisting of: carbon fibers, glass fibers, carbon black particles, and combinations thereof.

In one non-limiting variation, the thermoplastic composite may be nylon 6 having about 30 weight % carbon fiber distributed therein. Such thermoplastic composite materials may be manufactured from a compression molding process or an injection molding process.

With renewed reference to FIG. 2, the second workpiece 62 has an adhesive precursor 64 applied to a surface 66. It should be noted that the adhesive precursor 64 may be applied continuously or alternatively to select regions of the surface 66. In certain aspects, as will be described further below, the adhesive precursor forms an adhesive selected from the group: acrylates, methacrylates, epoxies, copolymers, and combinations thereof, by way of example.

The first workpiece 60 has at least one preformed protrusion or deformation 70 in a region where the welding will occur to join the first workpiece 60 to the second workpiece 62. While only one preformed deformation 70 is shown, where workpieces having large surface areas are to be joined and welded, multiple preformed deformations may be present in the first workpiece 60 to provide multiple sites for welding in accordance with certain aspects of the present disclosure. Also, while not shown, the region to be welded may occur at terminal edges of the first workpiece 60 and the second workpiece 62. As noted above, such thermoplastic materials may be manufactured from a compression molding process or an injection molding process or other molding processes. In such processes, the die(s) (or mold(s)) for forming the first workpiece 60 complement one another to define one or more preformed deformation 70 during the compression molding or injection molding process.

Figure 3:
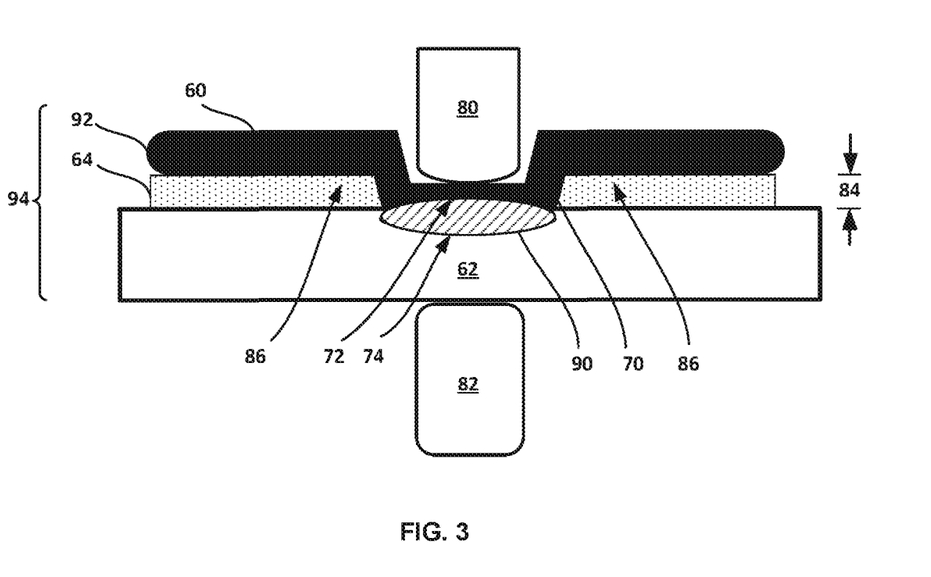
FIG. 3 shows a schematic where the two polymeric workpieces in FIG. 2 are disposed between an ultrasonic horn and an anvil in an ultrasonic welding apparatus in accordance with various aspects of the present disclosure.

As shown in FIG. 3, in certain aspects, the method may comprise disposing a first region 72 of the first workpiece 60 and a second region 74 of the second workpiece 62 between an ultrasonic horn 80 and an anvil 82. The ultrasonic horn 80 and anvil 82 form part of an ultrasonic welding device known in the art (not shown). At least one of the ultrasonic horn 80 or the anvil 82 seats within the preformed deformation 70. As shown in FIG. 3, the ultrasonic horn 80 is seated in the preformed deformation 70, but the orientation of the anvil 82 and/or first workpiece 60 could be reoriented so that the anvil 82 seats within the preformed deformation 70. In certain aspects, the preformed deformation 70 has a cross-sectional shape that generally corresponds to a cross-sectional shape of the ultrasonic horn and the method further comprises seating the ultrasonic horn in the preformed deformation 70. For example, the preformed deformation 70 may have a round or oval cross-sectional shape that corresponds to a round or oval cross-sectional shape of the ultrasonic horn 80. Other shapes are likewise contemplated for the preformed deformation 70 and ultrasonic horn 80 (or anvil 82), such as rectangular or other shapes.

In this manner, the first workpiece 60 contacts the second workpiece 62 along the preformed deformation 70, so that the protrusion enhances contact between the workpieces. The preformed deformation 70 is dimensioned to control and provide a predetermined bondline 84 thickness of adhesive (formed by reacting or curing adhesive precursor 64) between the first workpiece 60 and the second workpiece 62 in regions 86 outside the welding zone.

Next, the method includes applying ultrasonic energy from the ultrasonic horn 80 to create a weld nugget 90 between the first workpiece 60 and the second workpiece 62. The preformed deformation 70 protrudes and brings the ultrasonic horn 80 in closer proximity to the opposing workpiece (here second workpiece 62) to form a stronger or more desirable ultrasonic weld nugget 90 than where the first workpiece 60 and second workpiece 62 are separated with adhesive disposed therebetween. The weld nugget 90 may have a diameter of greater than or equal to about 3 mm and less than or equal to about 18 mm, in certain variations, the weld nugget 90 may have a diameter of greater than or equal to about 5 mm to less than or equal to about 18 mm. The preformed deformation 70 induces a mixed-mode loading under a given remote loading so that the peel strength of the joint can be improved. Further, the amount of spread of the adhesive precursor 64 is desirably controlled in accordance with certain aspects of the present disclosure so that it does not extend beyond a terminal edge or flange 92 of the first workpiece 60 to better control adhesive spread and bondline thickness. Furthermore, the size of the preformed deformation 70 and ultrasound horn's 80 dimensions (e.g., diameter) can be selected to minimize adhesive degradation at the edge of the flange 92. When ultrasonic energy is applied, the first workpiece 60 and the second workpiece 62 may oscillate at a frequency of greater than or equal to about 15 KHz to less than or equal to about 40 KHz, optionally greater than or equal to about 20 KHz to less than or equal to about 30 KHz. The force squeezes the adhesive/adhesive precursor 64 so that the ultrasonic waves can be transmitted through the workpieces, and consequently the heat can be produced at the faying interfaces of the workpieces 60, 62. In this manner, a weld is produced in accordance with certain aspects of the present teachings that minimizes the adhesive degradation by tailoring a weld schedule of force from the ultrasonic horn over time, where the force may be applied at the same levels, but more rapidly than in a conventional welding process.

In this manner, a green assembly 94 is formed that includes the first workpiece 60, second workpiece 62, weld nugget 90, and the adhesive precursor 64. The green assembly 94 formed by such a method has a green strength such that the assembly can be further processed immediately, for example, in an assembly line. By "immediately," it is meant that the green assembly 94 can be transferred in less than or equal to about 30 seconds, optionally less than or equal to about 20 seconds, optionally less than or equal to about 10 seconds, optionally less than or equal to about 5 seconds, and in certain variations, optionally transferred within about 1 second to about 5 seconds after the ultrasonic horn 80 and anvil 82 are withdrawn and the welding process is complete. Thus, the methods of certain aspects of the present disclosure may further include transferring the green assembly 94 to at least one downstream processing station in an assembly line production process. In certain aspects, the weld schedule of time versus horn force for the ultrasonic welder can be optimized to obtain a desired green strength (e.g., strength to hold the workpieces/parts together) while minimizing the adhesive degradation.

After all the processing is completed, the adhesive precursor 64 is permitted to react or cure to form an adhesive at ambient temperature and pressure conditions. For example, the ambient temperature may be room temperature of about 20° C. (68° F.) and ambient pressure may be about 101 kPa (1 atm). In this manner, the curing can be delayed in comparison to conventional assembly methods for plastic workpieces and thus, the curing or heating station need not follow welding, so that processing of the green assembly 94 may be conducted immediately and far more rapidly, amounting to a decreased processing or cycle time and well as decreased costs associated with tooling.

In this manner, a robust solution for joining parts opens up new opportunities to use polymeric composites to achieve weight reduction, performance and corrosion resistance improvement in various applications, including in vehicles. The processes according to certain aspects of the present disclosure provide greater robustness of assemblies through improvement of the welding process and part design. Polymeric composites are widely used in vehicles, such as automobiles, motorcycles, boats, tractors, buses, mobile homes, campers, and tanks, and their utilization will be increasing in the future with efforts to further reduce vehicle mass. Reinforced composites are particularly suitable for use in components of an automobile or other vehicle (e.g., motorcycles, boats), but may also be used in a variety of other industries and applications, including aerospace components, industrial equipment and machinery, farm equipment, heavy machinery, by way of non-limiting example. For example, reinforced composites may be used to form automotive structural components having contoured or complex three-dimensional shapes. Non-limiting examples include gas tank protection shields, underbody shields, structural panels, door panels, interior floors, floor pans (e.g., of a cargo van), roofs, exterior surfaces, storage areas, including glove boxes, console boxes, trunks, trunk floors, truck beds, and the like.

Figure 4:
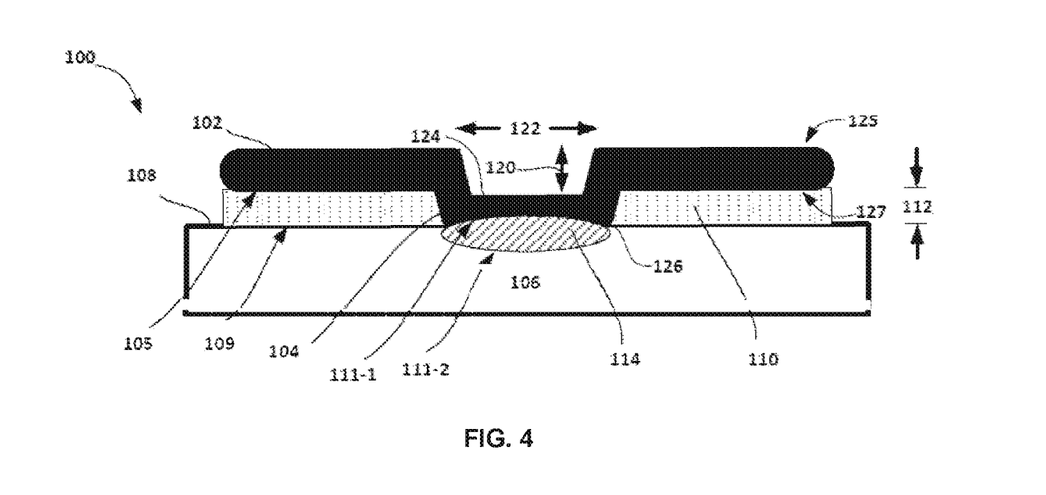
FIG. 4 shows a schematic of an assembly after ultrasonic welding of two polymeric workpieces joined with a weld nugget and an adhesive in accordance with various aspects of the present disclosure.

In other aspects, the present disclosure provides an assembly 100 in FIG. 4 comprising a first thermoplastic polymer workpiece 102 having a preformed deformation 104 in a first region 105 to be welded. The assembly 100 also includes a second thermoplastic polymer workpiece 106, which may have a conventional planar or flat surface 108 in a second region 109 to be joined. An adhesive 110 is disposed between a distinct third region 111-1 of the first thermoplastic polymer workpiece 102 and a distinct fourth region 111-2 of the second thermoplastic polymer workpiece 106. A thickness of the bondline 112 of the adhesive 110 is shown. In certain aspects, the adhesive 110 defines a predetermined bondline 112 having an average thickness of greater than or equal to about 0.25 mm to less than or equal to about 1.25 mm. The assembly 100 also includes a weld nugget 114 formed between the second thermoplastic polymer workpiece 106 and the first thermoplastic polymer workpiece 102 in a region corresponding to the preformed deformation 104. The weld nugget 114 may be formed by the methods described above.

In certain aspects, the first thermoplastic polymer workpiece 102 and the second thermoplastic polymer workpiece 106 each independently has a thickness of greater than or equal to about 0.5 mm to less than or equal to about 5 mm. Notably, as shown in FIG. 4, the first thermoplastic polymer workpiece 102 has a distinct thickness from that of second thermoplastic polymer workpiece 106, although in alternative variations, the thicknesses may be the same. The preformed deformation 104 may have a depth 120 of greater than or equal to about 0.5 mm and less than or equal to about 3 mm. The preformed deformation 104 may have a diameter (in the case of a round or circular cross-section) or width 122 (e.g., a greatest dimension across the preformed deformation 104) of greater than or equal to about 7 mm and less than or equal to about 20 mm. In certain aspects, the preformed deformation 104 has a round or oval cross-sectional shape, although in alternative variations, it may be rectangular or have other shapes. The preformed deformation 104 may define a depression 124 on a first side 125 of the first thermoplastic polymer workpiece 102 and protrusion 126 on a second side 127 of the first thermoplastic polymer workpiece 102.

The first thermoplastic polymer workpiece 102 and the second thermoplastic polymer workpiece 106 can be any of the materials described above. The adhesive 110 may be selected from the group: acrylates, methacrylates, epoxies, copolymers, and combinations thereof. Examples of suitable adhesives include methacrylate adhesives, such as PLEXUS® MA300, PLEXUS® MA310, PLEXUS® MA320, PLEXUS® MA425, PLEXUS® MA530, and PLEXUS® MA830 all commercially available from ITW Plexus. An example of another suitable adhesive is an epoxy commercially available as HENKEL™ 5089. In certain preferred aspects, the adhesive precursor may be one that has two parts that are mixed around a ratio of 1:1 for ease of commercial production and processing.

Figure 5:
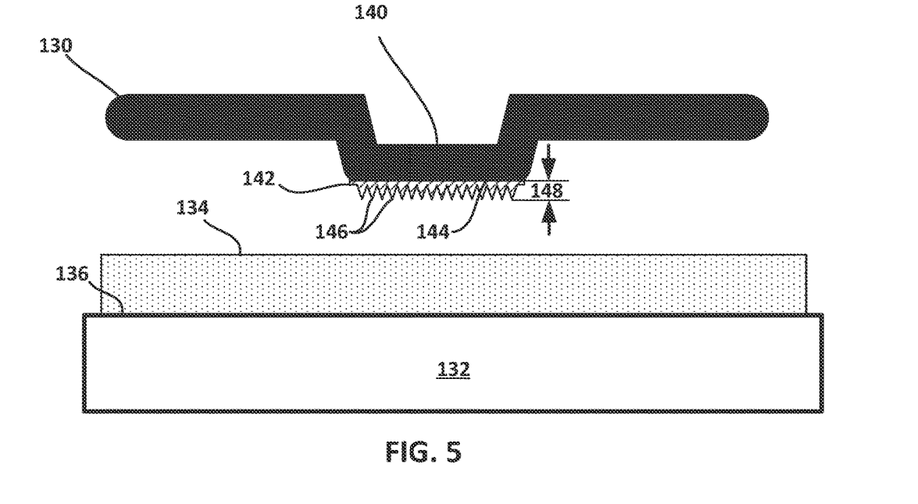
FIG. 5 shows a schematic of two polymeric workpieces to be joined having an applied adhesive precursor, where one workpiece has a protruding preformed deformation including an energy director layer defining a plurality of energy directors in accordance with certain aspects of the present disclosure.

In yet another variation shown in FIG. 5, a first thermoplastic polymer workpiece 130 and a second thermoplastic polymer workpiece 132 are to be welded. An adhesive precursor 134 is disposed on a planar surface 136 of the second thermoplastic polymer workpiece 132. The first thermoplastic polymer workpiece 130 has a preformed deformation 140 in a region to be welded. An energy director layer 142 is formed on a contact side 144 of the preformed deformation 140. In certain aspects, the energy director layer 142 defines a plurality of energy director features 146. The energy director features 146 have specific material properties that promote localized heating and enhance the contact of the workpieces together to form a localized and controlled weld therebetween. The primary function of the energy director features 146 in the energy director layer 142 is to concentrate applied ultrasonic energy to rapidly initiate the heating and melting of the area at the faying or contacting interfaces of the first and second thermoplastic polymer workpieces 130, 132. The energy director layer 142 with the plurality of energy director features 146 is shown on the contact side 144 of the preformed deformation 140 of the first thermoplastic polymer workpiece 130, but may instead be formed on the second thermoplastic polymer workpiece 132 in alternative variations. It should be noted that in alternative variations, the energy director features 146 need not be formed as a continuous layer as shown in FIG. 5, but may instead form discrete and discontinuous features on the surface of the preformed deformation 140.

Each energy director feature 146 may be a raised triangular bead of material molded onto one of the workpieces, although alternative shapes are also contemplated, such as convex shaped protrusions, like rounded protrusions, bumps, nubs, and the like. The energy director layer 142 defining the plurality of energy director features 146 may be formed in the same compression molding process as the first thermoplastic polymer workpiece 130, where the material is selectively disposed as a layer on the blank forming the first thermoplastic polymer workpiece 130 or within select regions of an appropriately shaped mold region. The energy director layer 142 defining the energy director features 146 may be formed of a polymeric material, such as a resin or composite comprising one or more reinforcement materials. In certain aspects, the energy director layer 142 may comprise a common resin or polymer as the first thermoplastic polymer workpiece 130. The material properties (fabricated during molding) of energy director features 146 can be tailored to localize heat generation, which enhance the contact between the first and second thermoplastic polymer workpieces 130, 132 when ultrasonic weld-bonding of thermoplastic composites.

For example, the resin or polymer in the energy director layer 142 may melt or soften prior to the surrounding first thermoplastic polymer workpiece 130. In certain variations, an initial modulus of the material forming the energy director layer 142 is less than or equal to about 75% of a comparative modulus of the material forming the first thermoplastic polymer workpiece 130 on which the energy director layer 142 is formed. For example, where the first thermoplastic polymer workpiece 130 comprises a carbon fiber reinforced nylon composite (for example, having about 30 weight % carbon fiber), the energy director layer 142 may be a carbon fiber reinforced nylon composite having a lower carbon content (<30 weight % carbon fiber), so that the initial modulus is at least 75% less than that of the first thermoplastic polymer workpiece 130.

The energy director layer 142 defining the plurality of energy director features 146 may have an overall thickness 148 (from terminal ends of the energy director features 146 through and to an opposite terminal surface of the energy director layer 142) of greater than or equal to about 0.1 mm to less than or equal to about 0.5 mm. Each energy director feature 146 may have a width (e.g., along its base) of greater than or equal to about 0.1 mm to less than or equal to about 0.5 mm and a height of greater than or equal to about 0.1 mm to less than or equal to about 0.5 mm. The height and density (e.g., placement pattern and density) of the plurality of energy director features 146 on the energy director layer 142 on the contact surface 144 of the first thermoplastic polymer workpiece 130 improves weld growth and minimizes adhesive degradation at the edge of a flange.

Figure 6:
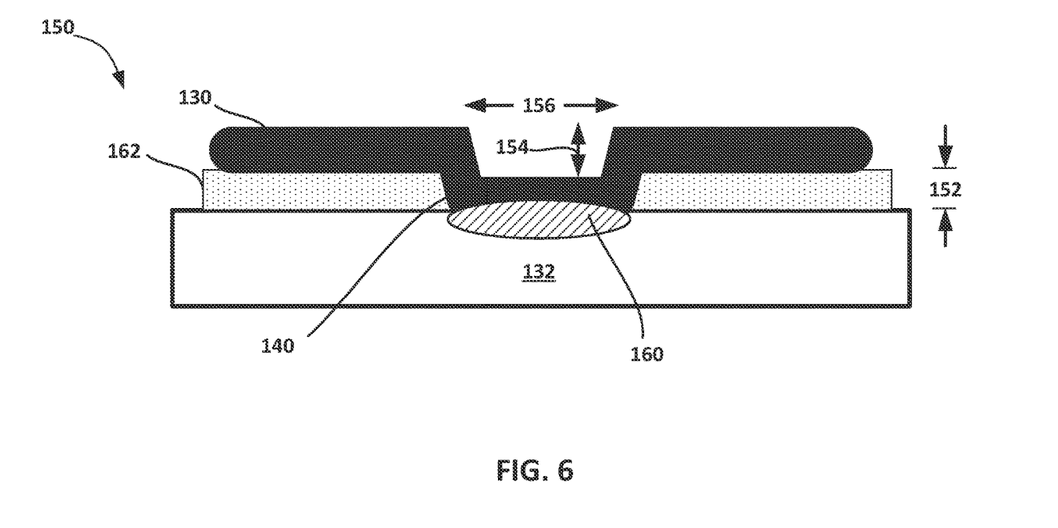
FIG. 6 shows a schematic of an assembly after ultrasonic welding of the two polymeric workpieces in FIG. 5 joined with a weld nugget formed at least in part from the energy director layer and an adhesive in accordance with various aspects of the present disclosure.

After welding, as shown in FIG. 6, an assembly 150 is formed that includes the first thermoplastic polymer workpiece 130 welded to the second thermoplastic polymer workpiece 132 via a weld nugget 160 in a region corresponding the preformed deformation 140. The weld nugget 160 includes a least a portion of the material that forms the energy director layer 142 and material from the first thermoplastic polymer workpiece 130 and/or the second thermoplastic polymer workpiece 132. The weld nugget 160 may be formed by the methods described above.

After polymerizing or curing, the adhesive precursor 134 forms an adhesive 162 that is disposed between the first thermoplastic polymer workpiece 130 and the second thermoplastic polymer workpiece 132, as previously described above. The adhesive 162 may extend further out laterally than the first thermoplastic polymer workpiece 130. A thickness of the bondline 152 of the adhesive 162 is shown. In certain aspects, the adhesive 162 defines a predetermined bondline 152 as described above in the previous embodiments, for example, having an average thickness of greater than or equal to about 0.25 mm to less than or equal to about 1.25 mm.

Figure 7:
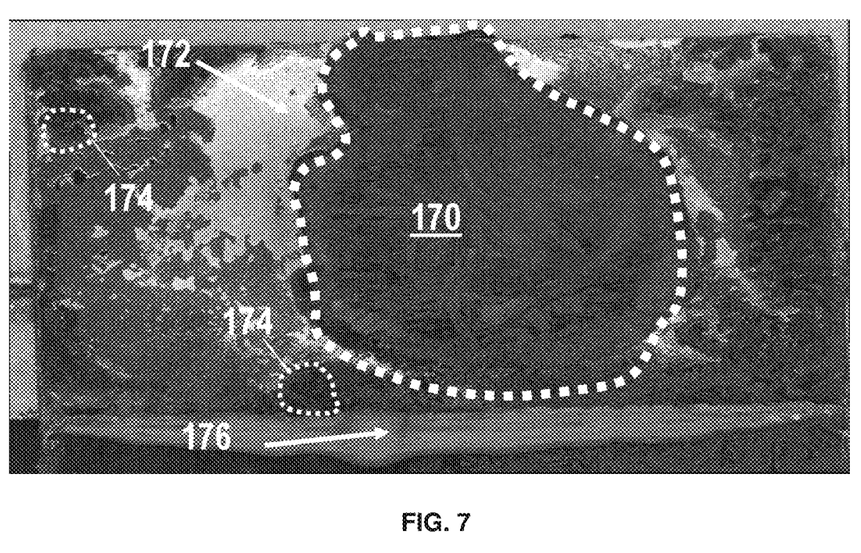
FIG. 7 shows a magnified image (50 times magnification) of a fractured surface of an overlap region of two welded polymeric workpieces having ghost welds formed therein.

FIG. 7 shows an overhead image of an ultrasonically welded region between two terminal regions of respective thermoplastic polymer workpieces where the surface is fractured. In the overlap region between the two welded polymeric workpieces, the free surfaces vibrate at an edge of overlap 176 during the ultrasonic welding. In FIG. 7, an ultrasonic weld nugget 170 is formed. Adhesive 172 is shown around the weld nugget 170. Heat from welding can degrade the adhesive 172 properties, and consequently the strength of the weld-bonded polymeric composite. It has been discovered that for regions that experience excessive vibration and heat (e.g., where terminal ends of polymeric workpieces overlap) during ultrasonic welding, ghost welds 174 may appear outside of the weld nugget 170. Ghost welds 174 thus damage the adhesive 172 and result in a local stress concentration, and consequently weaken the bond strength of the adhesive 172. In various aspects, the design including a workpiece having the energy director layer 142 with the plurality of energy director features 146, especially in combination with a preformed deformation/protrusion in the region to be welded, can serve to localize and direct ultrasonic energy into the weld nugget 170, while minimizing or avoiding formation of undesirable ghost welds 174. In certain variations, the region to be welded may be substantially free of ghost welds outside of the primary nugget. The term "substantially free" as referred to herein means that the ghost welds external to the primary weld nugget are absent to the extent that that physical properties and limitations attendant with their presence (e.g., measurable weakening of adhesive bond strength) are avoided. In this manner, material properties, geometry and density of energy directors can serve to improve the weld growth and minimize adhesive degradation at the faying surfaces between workpieces being joined together. The present disclosure thus provides ultrasonic weld-bonding with improved robustness at the weld joint.

In one aspect, the present disclosure contemplates methods of making a workpiece having an energy director layer with the plurality of energy director features. First, a layer of resin or polymeric material (e.g., 0.3 mm thick Nylon 6) can be added on select regions of the surface of the polymeric blank or disposed within the select regions of the mold. The mold may define a shape for the workpiece that includes the preformed deformation and one or more energy director features. The blank and resin/polymeric material can be molded together in the mold, for example, in a compression molding process, to form a protruded or deformed region, which may have an energy director layer defining a plurality of energy director features formed from the resin or polymeric material. The energy director features may be those described above. The plurality of energy director features may be capable of focusing the ultrasonic energy as it is applied. The energy director features may have specific material properties that promote localized heating and enhance the contact of the workpieces together. The preformed deformation or protrusion sets the bondline thickness between the workpieces.

In other aspects, the present disclosure provides a method for forming an assembly comprising a first thermoplastic polymer workpiece having a preformed deformation and an energy director layer with the plurality of energy director features in a first region to be welded. The assembly also includes a second thermoplastic polymer workpiece, which may have a planar or flat surface including in the region to be joined. The first and second thermoplastic polymer workpieces may be married together. The preformed deformation having an energy director layer defining a plurality of energy director features may have tailored material properties (fabricated from compression molding). The resin or polymer in the energy director layer promotes localized heating, enhances the contact of the first and second thermoplastic polymer workpieces. For example, the resin or polymer in the energy director layer may melt or soften prior to the surrounding workpiece materials to facilitate formation of the weld nugget in a select and predetermined region.

An adhesive is disposed between the first thermoplastic polymer workpiece and the second thermoplastic polymer workpiece, which may be formed from an adhesive precursor. The preformed deformation sets a bondline thickness between the first and second thermoplastic polymer workpieces and thus a bondline thickness of the adhesive. A thickness of the bondline of the adhesive may be in the range described previously above. A weld nugget is produced between the second thermoplastic polymer workpiece and the first thermoplastic polymer workpiece in a region corresponding to the preformed deformation and energy director layer defining the energy director features via ultrasonic weld-bonding. The weld nugget may be formed by the methods described above.

The energy director features, which may be located in the preformed deformation, are capable of focusing the ultrasonic energy as it is applied. In certain aspects, a weld is produced while minimizing the adhesive degradation with an appropriate weld schedule. For example, the welded region may be substantially free of ghost welds external to the primary weld nugget. Further, by adjusting the size of the preformed deformation and horn size (for various flange widths), adhesive degradation at edge of the flange and in the welded region can be minimized or prevented.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for ultrasonic welding of polymeric workpieces, the method comprising:

disposing a first region of a first thermoplastic polymer workpiece and a second region of a second thermoplastic polymer workpiece between an ultrasonic horn and an anvil of an ultrasonic welding device, wherein the first thermoplastic polymer workpiece has a preformed deformation in the first region, the entire preformed deformation being in the first region, the preformed deformation defining a depression on a first side of the first thermoplastic polymer workpiece and a protrusion on a second side of the first thermoplastic polymer workpiece, and at least one of the first thermoplastic polymer workpiece and the second thermoplastic polymer workpiece has an adhesive precursor layer applied thereto such that the adhesive precursor layer is disposed directly between and in direct contact with a third region of the first thermoplastic polymer workpiece and a fourth region of the second thermoplastic polymer workpiece, the third region being non-overlapping with the first region and the fourth region being non-overlapping with the second region, wherein at least one of the ultrasonic horn or the anvil seats within the preformed deformation to provide a predetermined bondline between the first thermoplastic polymer workpiece and the second thermoplastic polymer workpiece; and applying ultrasonic energy from the ultrasonic horn to create a weld nugget between the first region and the second region, wherein an assembly of the first thermoplastic polymer workpiece and the second thermoplastic polymer workpiece having the weld nugget has a green strength so that the assembly can be further processed immediately.

2. The method of claim 1, further comprising oscillating the first thermoplastic polymer workpiece and the second thermoplastic polymer workpiece at a frequency of greater than or equal to about 15 KHz to less than or equal to about 40 KHz.

3. The method of claim 1, wherein the preformed deformation has a depth of greater than or equal to about 0.5 mm and less than or equal to about 3 mm and a diameter or width of greater than or equal to about 7 mm and less than or equal to about 20 mm.

4. The method of claim 1, wherein the preformed deformation has a cross-sectional shape that corresponds to a cross-sectional shape of the ultrasonic horn and the method further comprises seating the ultrasonic horn in the depression of the preformed deformation during the disposing.

5. The method of claim 4, wherein the preformed deformation has a round or oval cross-sectional shape.

6. The method of claim 4, wherein the protrusion of the preformed deformation on the second side of the first thermoplastic polymer workpiece in the first region contacts a third side of the second thermoplastic polymer workpiece in the second region.

7. The method of claim 6, wherein during the disposing, the anvil is adjacent to a fourth side of the second thermoplastic polymer workpiece.

8. The method of claim 1, wherein the weld nugget has a diameter of greater than or equal to about 3 mm and less than or equal to about 18 mm.

9. The method of claim 1, wherein the first thermoplastic polymer workpiece and the second thermoplastic polymer workpiece each independently has a thickness of greater than or equal to about 0.5 mm to less than or equal to about 5 mm.

10. The method of claim 1, wherein the predetermined bondline where the adhesive is formed between the first thermoplastic polymer workpiece and the second thermoplastic polymer workpiece has an average thickness of greater than or equal to about 0.25 mm to less than or equal to about 1.25 mm.

11. The method of claim 1, wherein the first thermoplastic polymer workpiece and the second thermoplastic polymer workpiece are a composite material comprising:

a thermoplastic polymer formed from a material independently selected from the group consisting of: polyamide resin, polystyrene resin, acrylonitrile styrene resin, acrylonitrile-butadiene-styrene resin, polyvinyl alcohol resin, vinyl chloride resin, vinylidene chloride resin, vinyl acetate resin, acrylic resin, polyacrylate resin, methacrylate resin, polypropylene resin, polyethylene resin, polycarbonate resin, polyacetal resin, polylactide resin, polyethylene terephthalate resin, polyethylene naphthalate resin, polybutylene terephthalate resin, polyphenylene ether resin, polyphenylene sulfide resin, polysulfone resin, polyether sulfone resin, polyether ether ketone resin, copolymers, and combinations thereof; and a reinforcement material selected from the group consisting of: carbon fibers, glass fibers, carbon black particles, and combinations thereof.

12. The method of claim 1, wherein the adhesive precursor layer forms an adhesive selected from the group consisting of: acrylates, methacrylates, epoxies, copolymers, and combinations thereof.

13. The method of claim 1, wherein the assembly is transferred to at least one downstream processing station and after processing in the downstream processing station, the adhesive precursor layer is permitted to react and form the adhesive at ambient conditions.

14. The method of claim 1, wherein the first thermoplastic polymer workpiece further comprises a plurality of energy director features in the preformed deformation that are capable of focusing the ultrasonic energy as it is applied to initiate heating in the first region.

15. A method for ultrasonic welding of polymeric workpieces, the method comprising:

disposing a first region of a first thermoplastic polymer workpiece and a second region of a second thermoplastic polymer workpiece between an ultrasonic horn and an anvil of an ultrasonic welding device, wherein the first thermoplastic polymer workpiece is adjacent to the ultrasonic horn and the second thermoplastic polymer workpiece is adjacent to the anvil, wherein the first thermoplastic polymer workpiece has a preformed deformation in the first region, the entire preformed deformation being in the first region, the preformed deformation defining a depression on a first side of the first thermoplastic polymer workpiece and a protrusion on a second side of the first thermoplastic polymer workpiece, and at least one of the first thermoplastic polymer workpiece and the second thermoplastic polymer workpiece has an adhesive precursor layer applied thereto such that the adhesive precursor layer is disposed directly between and in direct contact with a third region of the first thermoplastic polymer workpiece and a fourth region of the second thermoplastic polymer workpiece, the third region being non-overlapping with the first region and the fourth region being non-overlapping with the second region, wherein the deformation has a cross-sectional shape that corresponds to a cross-sectional shape of the ultrasonic horn and the ultrasonic horn is seated within the depression of the preformed deformation to provide a predetermined bondline between the first thermoplastic polymer workpiece and the second thermoplastic polymer workpiece; and applying ultrasonic energy from the ultrasonic horn to create a weld nugget between the first region and the second region, wherein an assembly of the first thermoplastic polymer workpiece and the second thermoplastic polymer workpiece having the weld nugget has a green strength so that the assembly can be further processed immediately.

16. The method of claim 15, further comprising oscillating the first thermoplastic polymer workpiece and the second thermoplastic polymer workpiece at a frequency of greater than or equal to about 15 KHz to less than or equal to about 40 KHz.

17. The method of claim 15, wherein the deformation has a depth of greater than or equal to about 0.5 mm and less than or equal to about 3 mm and a diameter or width of greater than or equal to about 7 mm and less than or equal to about 20 mm.

18. The method of claim 15, wherein the preformed deformation has a round or oval cross-sectional shape.

19. The method of claim 15, wherein the weld nugget has a diameter of greater than or equal to about 3 mm and less than or equal to about 18 mm.

20. The method of claim 15, wherein the predetermined bondline where the adhesive is formed between the first thermoplastic polymer workpiece and the second thermoplastic polymer workpiece has an average thickness of greater than or equal to about 0.25 mm to less than or equal to about 1.25 mm.

\* \* \* \* \*